(12) United States Patent
Garcia Rodriguez et al.

(10) Patent No.: US 12,336,005 B2
(45) Date of Patent: Jun. 17, 2025

(54) CHANNEL SENSING IN MULTI-LINK CAPABLE WIRELESS DEVICE

(71) Applicant: Nokia Technologies Oy, Espoo (FI)

(72) Inventors: Adrian Garcia Rodriguez, Santa Cruz de Tenerife (ES); Mika Kasslin, Espoo (FI); Olli Alanen, Vantaa (FI); Lorenzo Galati Giordano, Dublin (IE)

(73) Assignee: Nokia Technologies Oy, Espoo (FI)

( * ) Notice: Subject to any disclaimer, the term of this patent is extended or adjusted under 35 U.S.C. 154(b) by 376 days.

(21) Appl. No.: 17/917,620

(22) PCT Filed: Apr. 9, 2020

(86) PCT No.: PCT/EP2020/060113
§ 371 (c)(1),
(2) Date: Oct. 7, 2022

(87) PCT Pub. No.: WO2021/204385
PCT Pub. Date: Oct. 14, 2021

(65) Prior Publication Data
US 2023/0180290 A1    Jun. 8, 2023

(51) Int. Cl.
*H04W 74/0808* (2024.01)
*H04L 47/129* (2022.01)
*H04W 84/12* (2009.01)

(52) U.S. Cl.
CPC ....... *H04W 74/0808* (2013.01); *H04L 47/129* (2022.05); *H04W 84/12* (2013.01)

(58) Field of Classification Search
CPC . H04W 74/0808; H04W 84/12; H04W 88/10; H04L 47/129
See application file for complete search history.

(56) References Cited

U.S. PATENT DOCUMENTS

2008/0008146 A1* 1/2008 Oikawa ............... H04W 36/02
                                                  370/338
2015/0085667 A1* 3/2015 Sivanesan ............ H04L 47/122
                                                  370/237
(Continued)

OTHER PUBLICATIONS

Fischer, M. (Broadcom Inc.), "MLO Synchronous Transmission," IEEE vol. 802.11-20/0081r2, Jan. 10, 2020, pp. 1-59.
(Continued)

*Primary Examiner* — Yaotang Wang
(74) *Attorney, Agent, or Firm* — McCarter & English LLP (57) ABSTRACT

This document discloses a solution for decoding frames received via multiple links. According to an aspect, a method for an apparatus of a wireless network includes: decoding at least a first part of a first frame received on a first channel; detecting, during said decoding the first part of the first frame, transmission of a second frame on a second channel; in response to said detecting, buffering at least a first part of the second frame, the first part of the second frame including duration information; after said decoding the first part of the first frame, decoding at least the first part of the second frame; updating, on the basis of the duration information, channel occupation information of the second channel; starting, based at least partly on the channel occupation information of the second channel indicating that the second channel not occupied, contention for channel access on the second channel.

20 Claims, 4 Drawing Sheets

(56) References Cited

U.S. PATENT DOCUMENTS

| | | | |
|---|---|---|---|
| 2015/0288988 A1* | 10/2015 | Ooi | H04N 7/185 |
| | | | 725/81 |
| 2016/0080055 A1* | 3/2016 | Sahin | H04B 7/155 |
| | | | 375/267 |
| 2017/0118793 A1* | 4/2017 | Liu | H04W 76/28 |
| 2021/0022122 A1* | 1/2021 | Khoshnevisan | H04L 5/001 |

OTHER PUBLICATIONS

Huang, P. et al., (Intel), "Multi-link BA," IEEE vol. 802.11-20/0053r2, Jan. 10, 2020, pp. 1-20.
Yunbo, L. et al., (Huawei), "Discussion of More Data subfield for multi-link," IEEE vol. 802.11-20/0472r0, Mar. 15, 2020, pp. 1-8.
Fischer, M. (Broadcom), "Synchronous Transmitter Medium State Information," IEEE vol. 802.11-20/0082r0, Jan. 9, 2020, pp. 1-29.

\* cited by examiner

CHANNEL SENSING IN MULTI-LINK CAPABLE WIRELESS DEVICE

CROSS REFERENCE TO RELATED APPLICATION

This patent application is a U.S. National Stage application of International Patent Application Number PCT/EP2020/060113 filed Apr. 9, 2020, which is hereby incorporated by reference in its entirety.

FIELD

Various embodiments described herein relate to the field of wireless communications and, particularly, to performing channel sensing in a wireless device capable of operating multiple wireless links.

BACKGROUND

With the development of wireless networks, devices with new features and capabilities emerge. A multi-link capable device may be capable of communicating with another wireless device over a radio connection comprising multiple radio links. Operating multiple links concurrently may improve throughput and/or reduce channel access delays.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a wireless network, comprising means for performing: decoding at least a first part of a first frame received on a first channel; detecting, during said decoding the first part of the first frame, transmission of a second frame on a second channel; in response to said detecting, buffering at least a first part of the second frame, the first part of the second frame comprising duration information; after said decoding the first part of the first frame, decoding at least the first part of the second frame; updating, on the basis of the duration information, channel occupation information of the second channel; starting, based at least partly on the channel occupation information of the second channel indicating that the second channel not occupied, contention for channel access on the second channel.

In an embodiment, the means are configured to perform channel sensing concurrently on the first channel and the second channel.

In an embodiment, the means are configured to perform said buffering when the means have at least temporarily insufficient processing capacity to perform said decoding concurrently for the first frame and the second frame.

In an embodiment, the channel occupation information comprises network allocation vector information.

In an embodiment, the apparatus is for a terminal device associated to an access node of a wireless local area network.

In an embodiment, the means are configured to suspend channel access on the second channel after an end of the second frame and during said decoding the at least first part of the second frame.

In an embodiment, the means are configured to store, in connection with buffering the at least first part of the second frame, a start time of the second frame, and to update the channel occupation information of the second channel on the basis of the duration information and the start time of the second frame.

In an embodiment, the means are configured to buffer the at least first part of the second frame after synchronizing to the second frame.

In an embodiment, the means are configured to, upon detecting a frame transmission on the first channel substantially simultaneously with detecting a frame transmission on the second channel, select one of the two frame transmissions for said decoding on the basis of a determined criterion.

In an embodiment, the first part of the first frame comprises a first physical layer convergence protocol preamble, a first physical layer convergence protocol header, and a first medium access control protocol data unit, and the first part of the second frame comprise a second physical layer convergence protocol preamble, a second physical layer convergence protocol header, and a second medium access control protocol data unit.

In an embodiment, the means comprises at least one processor and at least one memory including computer program code, wherein the at least one memory and computer program code are configured to, with the at least one processor, cause the performance of the apparatus.

According to another aspect, there is provided a method for an apparatus of a wireless network, comprising: decoding, by the apparatus, at least a first part of a first frame received on a first channel; detecting, by the apparatus during said decoding the first part of the first frame, transmission of a second frame on a second channel; in response to said detecting, buffering by the apparatus at least a first part of the second frame, the first part of the second frame comprising duration information; after said decoding the first part of the first frame, decoding by the apparatus at least the first part of the second frame; updating, by the apparatus on the basis of the duration information, channel occupation information of the second channel; starting, by the apparatus based at least partly on the channel occupation information of the second channel indicating that the second channel not occupied, contention for channel access on the second channel.

In an embodiment, the apparatus performs channel sensing concurrently on the first channel and the second channel.

In an embodiment, the apparatus performs said buffering when the apparatus has at least temporarily insufficient processing capacity to perform said decoding concurrently for the first frame and the second frame.

In an embodiment, the channel occupation information comprises network allocation vector information.

In an embodiment, the apparatus performing the method is a terminal device associated to an access node of a wireless local area network.

In an embodiment, the apparatus suspends channel access on the second channel after an end of the second frame and during said decoding the at least first part of the second frame.

In an embodiment, the apparatus stores, in connection with buffering the at least first part of the second frame, a start time of the second frame, and updates the channel occupation information of the second channel on the basis of the duration information and the start time of the second frame.

In an embodiment, the apparatus buffers the at least first part of the second frame after synchronizing to the second frame.

In an embodiment, the apparatus selects, upon detecting a frame transmission on the first channel substantially simultaneously with detecting a frame transmission on the second channel, one of the two frame transmissions for said decoding on the basis of a determined criterion.

In an embodiment, the first part of the first frame comprises a first physical layer convergence protocol preamble, a first physical layer convergence protocol header, and a first medium access control protocol data unit, and the first part of the second frame comprise a second physical layer convergence protocol preamble, a second physical layer convergence protocol header, and a second medium access control protocol data unit.

According to another aspect, there is provided a computer program product embodied on a computer-readable medium and comprising a computer program code readable by a computer for an apparatus of a wireless network, wherein the computer program code configures the computer to carry out a computer process comprising: decoding at least a first part of a first frame received on a first channel; detecting, during said decoding the first part of the first frame, transmission of a second frame on a second channel; in response to said detecting, buffering at least a first part of the second frame, the first part of the second frame comprising duration information; after said decoding the first part of the first frame, decoding at least the first part of the second frame; updating, on the basis of the duration information, channel occupation information of the second channel; starting, based at least partly on the channel occupation information of the second channel indicating that the second channel not occupied, contention for channel access on the second channel.

In an embodiment, the computer program product further comprising a computer program code that configures the computer to carry out the steps of any one of the above-described methods.

LIST OF DRAWINGS

Embodiments are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
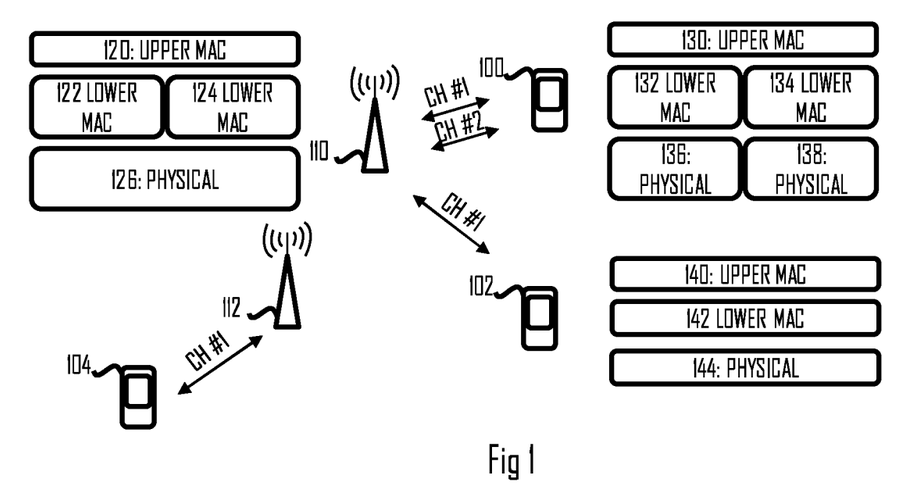
FIG. 1 illustrates a wireless communication scenario to which some embodiments of the invention may be applied.

A general wireless communication scenario to which embodiments of the invention may be applied is illustrated in FIG. 1. FIG. 1 illustrates wireless communication devices comprising a plurality of access points (AP) 110, 112 and a plurality of wireless terminal devices or stations (STA) 100, 102, 104. Each AP may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP, and a general term for an apparatus managing a wireless network such as the BSS and providing the stations with wireless services is an access node. The APs 110, 112 may also provide access to other networks, e.g. the Internet. In another embodiment, the BSS may comprise a plurality of APs to form an extended service set (ESS), e.g. the AP 110 or 112 may belong to the same ESS with another AP and have the same service set identifier (SSID). However, in some embodiments described below, the APs 110, 112 are considered to provide different wireless networks (different BSSs), overlapping BSSs (OBSS) operating at least partially on the same channels. While embodiments of the invention are described in the context of the above-described topologies of IEEE 802.11 based networks, it should be appreciated that these or other embodiments of the invention may be applicable to networks based on other specifications, e.g. different versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards.

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac amendment extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. These principles apply to other 802.11 specifications as well, e.g. 802.11ax.

Some IEEE 802.11 networks employ channel contention based on carrier sense multiple access with collision avoidance (CSMA/CA) for channel access. The CSMA/CA is an example of a physical carrier sensing function to determine whether the first channel and the second channel, respectively, is busy or idle. Every device attempting to gain a transmission opportunity (TXOP) is reducing a backoff value while the primary channel is sensed to be idle for a certain time interval. The backoff value may be selected randomly within a range defined by a contention window parameter. The contention window may have different ranges for different types of traffic, thus affecting priority of the different types of traffic. The channel sensing may be based on sensing a level of radio energy in the radio channel. The sensed level may be compared with a threshold: if the sensed level is below the threshold level, the channel may be determined to be idle (otherwise busy). Such a procedure is called clear channel assessment (CCA) in 802.11 specifications. When the backoff value reaches zero, the device gains the TXOP and starts frame transmission. If another device gains the TXOP before that, the backoff value computation may be suspended, and the device continues the backoff computation after the TXOP of the other device has ended and the primary channel is sensed to be idle. The time duration (the backoff value) may not be decremented during the TXOP of the other device, but the time duration that already lapsed before the suspension may be maintained, which means that the device now has a higher probability of gaining the TXOP. Once the device wins the channel contention and gains access to the channel, it may transmit a frame that defines a reservation period for the channel access. The reservation period may be defined by a duration field in the frame. Upon detecting the reservation period from the frame, any other device contending on the same channel may set a network allocation vector (NAV) for the duration of the reservation period and refrain the contention on the channel for the duration of the reservation period. The use of NAV for determining that the channel is busy is called virtual carrier sensing in some literature.

When performing the channel contention, a device may employ different access parameters for the different frames. The differing access parameters may comprise quality-of-service (QoS) parameters such as enhanced distributed channel access (EDCA) parameters of IEEE 802.11 technology. The EDCA parameters may comprise a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP.

The STA 100, 102, 104 may be considered to be a terminal device or a station capable of connecting or associating to any one of the APs 110, 112. The STA may establish a connection with any one of APs it has detected to provide a wireless connection within the neighbourhood of the STA. The connection establishment may include authentication in which an identity of the STA is established in the AP. The authentication may comprise setting up an encryption key used in the BSS. After the authentication, the AP and the STA may carry out association in which the STA is fully registered in the BSS, e.g. by providing the STA with an association identifier (AID). A separate user authentication may follow association, which may also comprise building an encryption key used in the BSS. It should be noted that in other systems terms authentication and association are not necessarily used and, therefore, the association of the STA to an AP should be understood broadly as establishing a connection between the STA and the AP such that the STA is in a connected state with respect to the AP and waiting for downlink frame transmissions from the AP and monitoring its own buffers for uplink frame transmissions. A STA not associated to the AP is in an unassociated state. An unassociated STA may still exchange some frames with the AP, e.g. discovery frames.

With the development of the 802.11 networks, a multi-link feature has been introduced. For example, there has been discussions in IEEE 802.11be task group related to developing a capability of accessing multiple channels concurrently and independently of one another. Before discussing that aspect more, let us describe a protocol layer of STA 102 that represents a legacy device with no such multi-link capability. In some legacy devices, a single protocol stack is supported where there is a single protocol entity on a physical layer 144 and on upper and lower medium access control (MAC) layers 140, 142. The physical layer 144 may handle radio frequency and baseband signal processing tasks in the transmission and reception. The lower MAC layer 142 may be responsible for channel contention, including the NAV, CCA etc. The upper MAC layer 140 may be responsible of the association and authentication procedures, for example. In other legacy devices, multiple MAC layers and multiple physical layers may be provided but the number of MAC layers is equal to the number of physical layers. The legacy devices may support operation multiple channels with the condition that the channel contention is performed only on the primary channel. Upon successful channel contention on the primary channel, the device may transmit a frame on the primary channel and, further, on one or more secondary channels. The CCA procedure may be executed on the secondary channel(s) to ensure that they are also free for transmission. The split of the MAC layer into lower and upper MAC layer may be logical and/or physical. For example, a different physical entity may execute functions of the lower MAC layer than a physical entity executing functions of the upper MAC layer. In some embodiments, the device includes only a single MAC layer.

In general, the term 'legacy device' may follow the definition conventionally used in the field. A legacy device may refer to an outdated or earlier version of a communication protocol that is still operational in the wireless networks, together with modern devices supporting later or latest version(s) of the communication protocol.

The embodiments described below relate to a wireless device with multi-link-capability and having multiple parallel lower protocol layers, e.g. the STA 100 or the access node 110. As illustrated in FIG. 1, the STA 100 may support a single upper MAC layer 130 and multiple lower MAC layers 132, 134, and a physical layer 136, 138 per lower MAC layer 132, 134. Similarly, some access nodes (e.g. the access node 112) may have a corresponding protocol stack. In the embodiment of FIG. 1, the access node 110 supports a single upper MAC layer 120 and multiple lower MAC layers 122, 124, and a single physical layer 126 that serves multiple lower MAC layers. Some stations (e.g. the STA 104) may have a corresponding protocol stack. The multiple lower protocol layers (per upper MAC layer) enable the wireless device to contend, within the same association, simultaneously on multiple channels and to transmit in parallel and independently on the multiple channels. Accordingly, the single association may be called a multi-link association enabled by the multiple physical layers (and multiple lower MAC layers) per upper MAC layer. This distinguishes from those legacy devices that have multiple physical layers and multiple lower MAC layers but only single physical layer and a single lower MAC layer per upper MAC layer. The multi-link capability also enables a plurality of associations between lower MAC layers within a single association between upper MAC layers of wireless devices.

Depending on the number of physical layers, the channels of the multi-link association may be on different frequency bands close to or distant from one another. The distant may be understood as so separated that it may not feasible to transmit or receive on the channels at the same time without using a dedicated radio front end (physical layer) for each channel. For example, the STA 100 supporting multiple physical layers may be capable of transmitting or receiving a frame concurrently on channels of multiple distant frequency bands. In the context of 802.11 systems, one of the channels may include a channel on a 2.4 GHz band while another one of the channels may include a channel on a 5 GHz band. Other systems may employ other frequency bands. However, the channels may be provided on the same frequency band as well. In this case, the wireless device 110 having a single physical layer serving multiple lower MAC layers may be capable of transmitting or receiving a frame concurrently on multiple channels of a single frequency band, e.g. the 2.4 GHz band or 5 GHz band. These embodiments alleviate the channel access in the sense that the wireless device 100, 110 is not necessarily limited by the congestion on one of the channels or bands of the wireless network, e.g. the primary channel. When the channels are on the same frequency band, device implementations may cause some restrictions on capabilities of transmitting simultaneously over multiple links. The devices may have capability of indicating such restrictions to other devices, e.g. via one or more information elements in data frames and/or management frames.

In the scenario of FIG. 1, the stations 100, 102 are associated to the access node 110 while the station 104 is associated to the access node 112. The stations 100, 102 (and 104) and the APs 110, 112 may be within the proximity of one another such that every device is capable of detecting one another's transmissions, when transmitted on the same channel. For example, the legacy station 102 may be capable of detecting the transmissions of the APs 110, 112 and the STA 100. The STA 100 may also be capable of detecting the transmissions of at least the APs 110, 112 and the STA 102.

At least some of multi-link capable wireless devices may be designed as low-cost devices with a limited signal processing capacity. While such devices may be capable of transmitting or receiving concurrently on multiple channels and over multiple links, the devices may have limited capability of concurrently processing two frames received over two different links. As described in greater detail below, a device may be capable of sensing two channels concurrently but not decoding concurrently multiple frames received on different channels. Such a situation may arise from the design of the device, e.g. the device may be provided with such a low signal processing capacity that it is incapable of processing two (or more) received frames concurrently. However, such a situation may arise when processing resources of the device are temporarily occupied for another task. The device may have sufficient processing capacity to process the two (or more) frames concurrently but the capacity is temporarily not available. Further scenarios where the limited processing capacity limits the concurrent processing of two (or more) frames received via different links can be envisaged.

Figure 2:
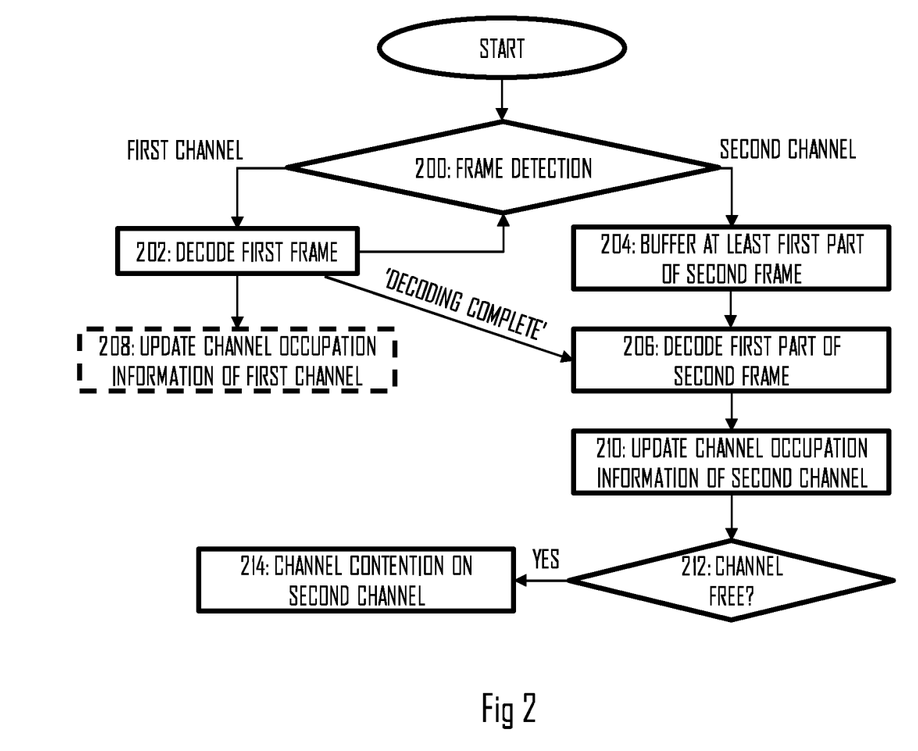
FIG. 2 illustrates an embodiment of a process for sequential decoding frames received over multiple links.

Referring to FIG. 2, let us describe a process for performing channel sensing and frame decoding according to an embodiment. The process may be executed in a multi-link capable wireless device such as a STA (e.g. STA 100) or an access node (e.g. the AP 110). Referring to FIG. 2, the process comprises: detecting transmission of a first frame on a first channel (block 200); decoding (block 202) at least a first part of the first frame received on the first channel; detecting (block 200), during said decoding the first part of the first frame, transmission of a second frame on a second channel; in response to said detecting in block 200, buffering (block 204) at least a first part of the second frame, the first part of the second frame comprising duration information; after said decoding the first part of the first frame in block 202, decoding at least the first part of the second frame in block 206; updating (block 210), on the basis of the duration information, channel occupation information of the second channel; and starting, based at least partly on the channel occupation information of the second channel indicating that the second channel not occupied, contention (block 214) for channel access on the second channel (YES in block 212).

In an embodiment, the duration information comprises a value in a duration field of the second frame. The value may indicate duration of the second frame or duration of a transmission opportunity related to the second frame. The transmission opportunity may comprise transmissions of multiple frames, e.g. multiple data frames and respective one or more acknowledgment frames.

In an embodiment, the device performs channel sensing between blocks 212 and 214. The channel sensing may be physical carrier sensing where the device measures the (second) channel for radio energy. If the measurements indicate that the (second) channel is free, block 214 may be executed.

In an embodiment, upon decoding the first frame in block 202, channel occupation information of the first channel may be updated (block 208) on the basis of duration information decoded from the first frame. If the first frame is addressed to the device executing the process, block 202 may comprise decode the whole first frame, e.g. both header and payload of the first frame. If the first frame is not addressed to the device executing the process, block 202 may include decoding only the header or only a part of the header.

The embodiment of FIG. 2 provides the multi-link capable device having limited processing capacity with capability of buffering at least a part of a frame received at least partially concurrently with another frame that is under decoding. Therefore, the part of the frame can be saved for later decoding and the part of the frame will not get lost. As a consequence, the device may maintain the awareness of channel occupation status on multiple channels even in a case where it is not capable of decoding frames on the multiple channels concurrently. Above, this principle is applied to a situation where the number of channels is two but the same principle can be applied to any number of channels concurrently operated by the multi-link capable device and any number of channels the device is capable of concurrently decoding. For example, the device may have capability of operating four separate links on four separate channels but have processing capacity of processing only two or three frames concurrently.

In an embodiment, the multi-link capable device performs channel sensing concurrently on at least the first channel and the second channel.

In an embodiment, the device performs said buffering when the device has at least temporarily insufficient processing capacity to perform said decoding concurrently for the first frame and the second frame.

Figure 3:
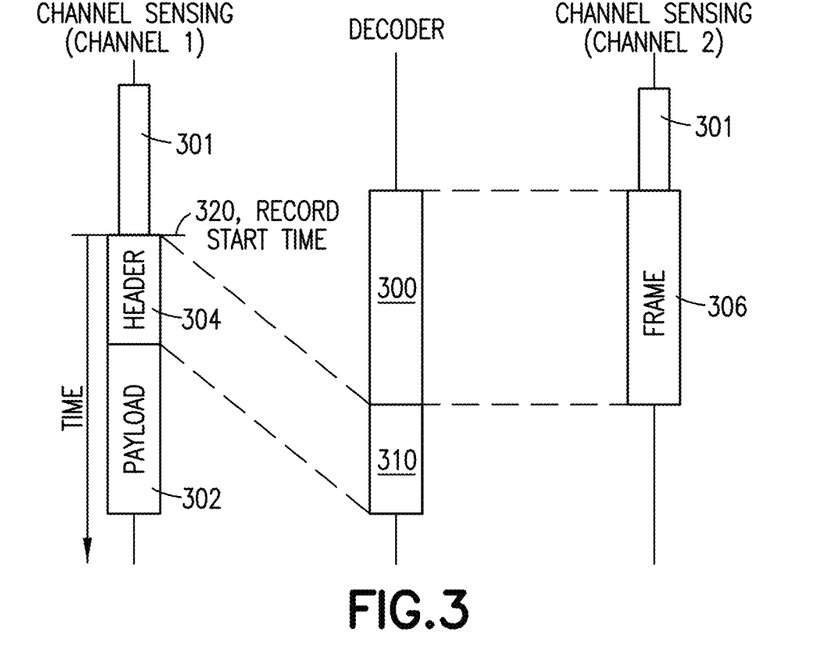
FIG. 3 illustrates buffering for the sequential decoding according to an embodiment.

FIG. 3 illustrates the buffering and sequential decoding of the first and second frame in a greater detail. Referring to FIG. 3, let us describe the concurrent channel sensing and sequential decoding. As illustrated in FIG. 3, the multi-link capable wireless device may have multiple independently operating channel sensing entities performing channel sensing 301 concurrently on channel 1 and channel 2. For example, if the device is the STA 100, one of the channel sensing entities may operate the physical layer 136 tuned to channel 1 of one frequency band while the other operates the physical layer 138 tuned to channel 2 or another frequency band. If the device is the access node 110, the channel sensing entities may operate the physical layer 126 tuned to channel 1 and channel 2 of the same frequency band. While performing the channel sensing on the channels 1 and 2, the channel sensing entity sensing channel 2 detects a frame 306 first. Since a decoder is currently idle, the decoder starts to decode the frame 306 (block 300). While performing the decoding in block 300, the channel sensing entity sensing channel 1 also reports a frame detection on channel 1. Let us call this frame the second frame. Since the decoder is currently busy, the channel sensing entity may record a start time of the second frame (320 in FIG. 3) and start buffering at least a first part of the second frame. In this example, the first part of the second frame comprises at least a part of a header 304 of the second frame. Depending on the buffering configuration and buffering capabilities of the device, the complete header or even the whole second frame including the header 304 and the payload 302 may be buffered.

When the decoder has finished decoding the frame 306, the decoder may search a buffer for another frame for decoding. As a result, the decoder detects the at least first part of the second frame in the buffer and starts decoding in block 310. The buffering enables decoding of the second frame although the device has no processing capacity at the time of receiving the second frame. The buffering also provides the device with channel awareness on both channels 1 and 2 and, as a consequence, the device may use conventional channel contention on both channels 1 and 2.

As described above, the first part of the second frame may include at least information on duration of a transmission opportunity associated with the second frame. By using the duration information, the device acquires information on a time interval the channel 1 is reserved to transfer of frames between a transmitter and a receiver of the second frame. As a consequence, the device may update the channel occupation information with the time interval. The device may use the combination of the recorded start time of the second frame and the duration information in the update. Since the (first part of the) second frame has been stored in the buffer for a while, a certain time interval may have passed since the reception of the second frame. Therefore, the recorded start time together with the duration enables computation of a time instant when the transmission opportunity ends. The channel occupation information may thus be updated with the information indicating when the transmission opportunity ends.

The operation of the device on channels 1 and 2 may be considered through states of the device on the respective channels 1 and 2. While performing the sensing 301 on both channels 1 and 2, the state of the device on both channels 1 and 2 is 'sensing'. Upon detecting the frame 306, the device starts to decode the frame and, then, the state of the device on channel 2 changes to 'decoding'. Meanwhile, the state of the device on channel 1 is still 'sensing'. Upon detecting the second frame on channel 1, the device starts buffering at least the first part of the second frame and, thus, the state of the device on channel 1 changes to 'buffering'. Meanwhile, the state of the device on channel 2 is still 'decoding'. Upon completing the decoding of the frame 306, the state of the device on channel 2 may change to 'sensing' again. The sensing may be carried out as a part of channel contention, for example. Meanwhile, the device starts to decode the second frame and, therefore, the state on channel 1 changes to 'decoding'. After completing decoding the second frame, the state on channel 1 changes according to the updated channel occupation information, e.g. to 'sensing' or to 'suspended access'. In the embodiment of FIG. 3, the device starts decoding the second frame while the payload part 302 of the second frame is still being received. Therefore, in some embodiments the device operates concurrently in the 'decoding' state and in the 'buffering' state for a channel. For example, the device may start decoding the second frame while at least a part of the second frame is still being buffered.

In an embodiment, the channel occupation information comprises network allocation vector information, e.g. the NAV described above. As described above, the device may use the NAV for virtual carrier sensing. Whenever the NAV is set for a channel, the channel is deemed busy. The device may monitor the expiry of the NAV before starting a channel contention on the channel. The device may also carry out physical carrier sensing where the device measures the channel for radio energy. If radio energy of a certain energy level (e.g. exceeding a threshold) is detected, the channel is deemed busy and the device prevents the channel contention. If no such radio energy is detected and no NAV is set, i.e. when both physical and virtual carrier sensing functions consider the channel idle, the device may perform the channel contention.

Figure 4:
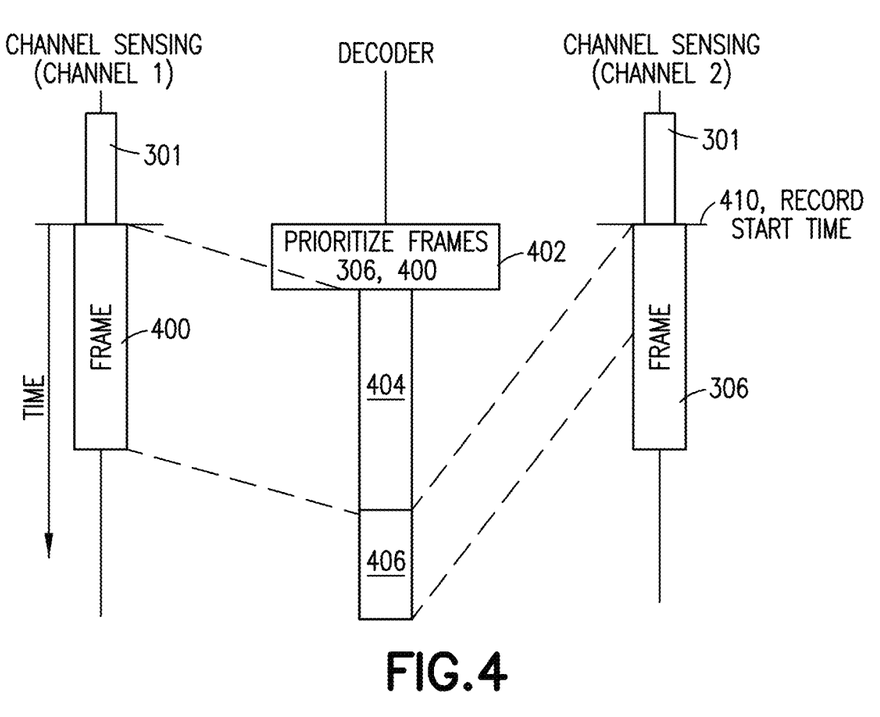
FIG. 4 illustrates an embodiment for prioritizing received frames for decoding.

In an embodiment where the device detects a frame transmission on the first channel substantially simultaneously with detecting a frame transmission on the second channel, the device selects one of the two frame transmissions for said decoding on the basis of a determined criterion. Further, the device may buffer the other one of the two frame transmissions for later decoding. FIG. 4 illustrates this embodiment.

Referring to FIG. 4, upon detecting while sensing the channels 1 and 2 (step 301) a frame 400 on channel 1 simultaneously with detecting the frame 306 on channel 2, the device prioritizes the two frames 306, 400 in block 402. The prioritization may be based on a measured received signal strength associated with the channels 1 and 2, for example. A frame received on a channel associated with a higher received signal strength may be selected for decoding, while a frame received on a channel associated with a lower received signal strength may be selected for buffering. The received signal strength may be measured from a signal comprising the respective frame, or it may have been measured earlier. In another embodiment, the prioritization is based on a frequency of the channel. For example, a frame received on a channel (mainly) employed by a wireless device with which the device executing the process of FIG. 4 is associated may be selected for decoding, and the other frame may be selected for buffering. A STA associated with an AP may monitor channels on which it receives frames from the AP and store information on channels used by the AP. An AP may employ one of the channels more than others, e.g. depending on traffic on the channels employed by the AP, and the STA may detect the channel mainly used by observing on which channels the frames are received from the AP. This information may then be used to prioritize the channel mainly employed by the associated AP. In the embodiment of FIG. 4, the device prioritizes a frame 400 received on channel 1 over the frame 306 and, as a consequence, the frame 400 is proceeded to decoding (block 404) while the frame 306 is buffered and decoded later in block 406.

Figure 5:
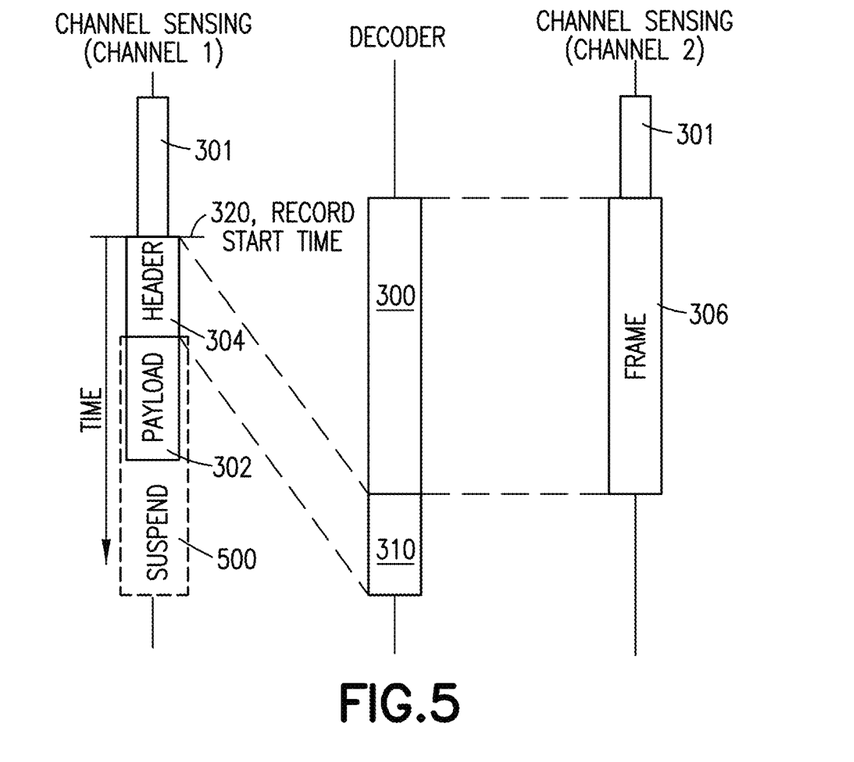
FIG. 5 illustrate channel access suspension according to an embodiment.

In an embodiment, the device suspends channel access on the second channel after an end of the second frame and during said decoding the at least first part of the second frame. In this embodiment, the device may, upon completing buffering the second frame, set a state for the second channel to 'suspended' until the buffered second frame has been decoded. FIG. 5 illustrates such an embodiment. While decoding the frame 306, the device buffers at least the first part of the second frame in the above-described manner. After buffering the at least first part of the second frame, the device may suspend (block 500) channel access on channel 1 where the second frame was received until the decoding of the second frame has been completed. Since the device cannot ascertain the channel occupation of channel 1 before decoding the second frame, the device may suspend the channel access on channel 1 to prevent collisions and to reduce power consumption.

Figure 6:
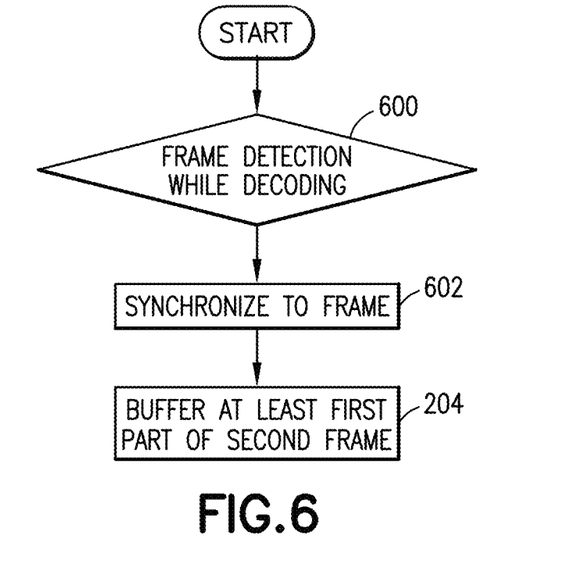
FIG. 6 illustrates a procedure for frame buffering according to an embodiment.

In an embodiment, the device performs the buffering after synchronizing to the received frame. The synchronization may include time and/or frequency synchronization. When buffered samples of the received frame are readily synchronized, the start of decoding the buffered samples may be expedited. FIG. 6 illustrates a process according to this embodiment. Referring to FIG. 6, upon detecting in block 600 a frame (e.g. the second frame) on a channel while decoding another frame received on another channel (e.g. frame 306), the device may carry out synchronization to the frame in block 602. The time/frequency synchronization itself may be carried out according to the state-of-the-art. Upon synchronizing to the frame, block 204 may be triggered and samples of at least the first part of the frame may be buffered for later decoding.

As described above, the device may decode at least the first part of the first frame and at least the first part of the (buffered) second frame. In an embodiment, the first part of the first frame comprises a first physical layer convergence protocol (PLCP) preamble, a first PLCP header, and a first medium access control (MAC) protocol data unit (PDU), and the first part of the second frame comprise a second PLCP preamble, a second PLCP header, and a second MAC PDU. In embodiments where the frame includes a PLCP header and one or more MAC PDUs and a MAC PDU carries the duration information, at least the PLCP header and the MAC header may be buffered for decoding. In other embodiments with other frame structures, at least a respective part of the frame used for updating the channel occupation information may be buffered for decoding.

Figure 7:
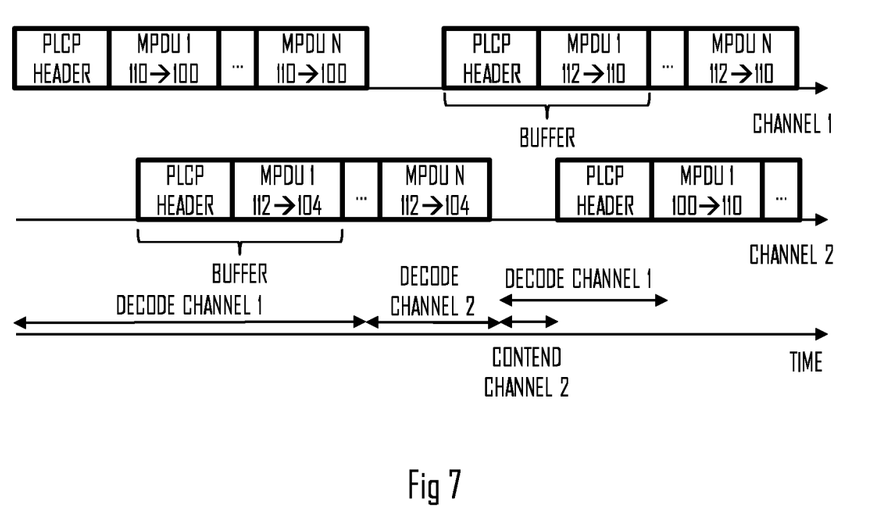
FIG. 7 illustrates multi-link operation of a wireless device according to an embodiment.

FIG. 7 illustrates the sequential decoding and an effect of some embodiments of the invention. The description is again limited to consideration of operation on only two channels, but the same principles are directly applicable to multi-link scenarios with more than two channels.

Referring to FIG. 7, let us assume that the device decoding frames in connection with FIG. 7 is the STA 100. As illustrated in FIG. 7, the device detects a frame first on channel 1. The device may start decoding at least the header(s) of the frame in order to determine whether or not the frame is addressed to the device. The device may thus start decoding of the first part of the frame, e.g. the PLCP header and the first MAC PDU (MPDU 1 in FIG. 7). Once the device has decoded required header information like a receiver address and the duration information, the device may determine as how to proceed with the further decoding of the frame. If the frame is addressed to the device (as is the case in this example), the device may continue decoding the frame until an end of the frame. Meanwhile, the device may continue the channel sensing on channel 2 (and other channels of the multi-link capable device, if any). While performing the decoding, the device may detect a frame on channel 2. Since the decoding is currently busy decoding the firstly received frame, the device may start buffering the frame detected on channel 2. At least the header of the frame may be decoded but, in some embodiments, even all the samples of the frame may be buffered. Let us assume that this frame is transmitted by the AP 112 to the STA 104. At least the PLCP header and the first MAC PDU may be buffered in order to acquire the channel occupation information for channel 2. After the decoding of the frame received on channel 1 is completed, the device may start decoding the buffered samples of the frame received on channel 2, as illustrated on the time line of FIG. 7. Meanwhile, the device may start channel contention on channel 1. However, let us assume that the AP 112 (also with multi-link capability) wins the channel access on channel 1 while transmitting the frame on channel 2. As a consequence, the device detects the frame on channel 1 while performing the channel contention and, as a response, stops the channel contention and starts to buffer samples of that frame while decoding the frame received on channel 2. Upon decoding the frame received on the channel 2 and updating the channel occupation information, the device may suspend channel contention on channel 2 until the channel occupation information indicates channel 2 to be free. Upon detecting the channel 2 to be free, the device may start the channel contention. In this case, let us assume that the device wins the channel access and starts transmission of a frame to the AP 110 on channel 2. Meanwhile, the device may still be decoding (and buffering) the frame received on channel 1.

As illustrated in FIG. 7, the device may maintain the multi-link capability with smart buffering of the received frames even in a case where the processing capacity of the device is limited. Additionally, the device may maintain normal channel contention rules.

Let us then consider a case where the frame received first on channel 1 is not addressed to the device, e.g. let us assume that the AP 110 transmits the frame to STA 102. In such a case, the device 100 may upon decoding the first part of the frame deem channel 1 as busy for the duration specified in the updated channel occupation information, and start decoding the frame received on channel 2 while the frame is still being transmitted on channel 1. Since channel 1 is still busy, the device may suspend channel contention on channel 1.

In an embodiment, the multi-link capable device performs gain control separately and independently for each link or channel. Such an independent gain control may be applied to detected and received frames in a digital domain for each link separately. While the device is sensing multiple links, it may adjust receiver gains for each of the links independently. Once a frame is detected on a channel of a link, the currently used gain may be stored together with the buffered samples of the detected frame. The gain setting may be used in decoding the buffered samples.

Figure 8:
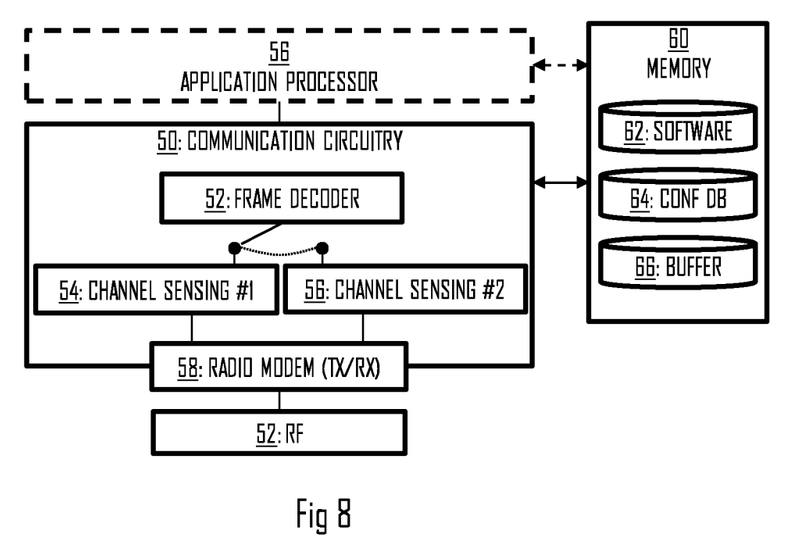
FIG. 8 illustrates a block diagram of a structure of an apparatus according to an embodiment of the invention.

FIG. 8 illustrates an embodiment of a structure of the above-mentioned functionalities of an apparatus executing the functions of the apparatus in the process of FIG. 2 or any one of the embodiments of FIG. 2 described above. The apparatus may be a wireless device such as the STA 100, or it may be an access node, e.g. the AP 110. The apparatus may comply with 802.11 specifications. The apparatus may be or may be comprised in a computer (PC), a laptop, a tablet computer, a cellular phone, a palm computer, a sensor device, a router device, or any other apparatus provided with radio communication capability. In another embodiment, the apparatus carrying out the process of FIG. 2 or any one of its embodiments is comprised in such a wireless device, e.g. the apparatus may comprise a circuitry, e.g. a chip, a chipset, a processor, a micro controller, or a combination of such circuitries in the wireless device. The apparatus may be an electronic device comprising electronic circuitries for realizing some embodiments of the wireless device.

Referring to FIG. 8, the apparatus may comprise a communication circuitry 50 providing the apparatus with capability of communicating in at least one wireless network. The communication circuitry may employ a radio interface providing the apparatus with radio communication capability. The radio interface may comprise a radio modem 58 and radio frequency (RF) circuitries 52 providing at least a part of the above-described physical layer(s) of the wireless device. The radio interface may be comprised in the apparatus in the embodiments where the apparatus is the wireless device. In other embodiments where the apparatus is a chipset for the wireless device, the radio interface may be external to the apparatus. The radio interface may support frame transmission and reception according to the principles described above. The RF circuitries 52 may comprise radio frequency converters and components such as an amplifier, filter, and one or more antennas. The radio modem 58 may comprise baseband signal processing circuitries such as (de)modulator and encoder/decoder circuitries. The communication circuitry may carry out at least some of the functions of the MAC layer(s) described above. In embodiments where the apparatus employs multiple physical layer entities, the radio modem 58 and the RF circuitries 52 may employ a separate transmitter and receiver branch for each of the multiple links supported by the apparatus. The radio modem 58 and the RF circuitries 52 may include a dedicated circuitry for the physical layer 126 or 136 and another dedicated circuitry for the physical layer 128 or 138, although the dedicated circuitries may employ partially the same physical components in the transmission and/or reception.

The communication circuitry 50 may comprise multiple channel sensing circuitries 54, 56, . . . each configured to perform channel sensing on a channel. The channel sensing circuitries 54, 56, . . . may operate concurrently, as described above. A channel sensing circuitry may operate the radio modem 58 and the RF components to tune into a respective channel to perform channel sensing in order to detect a frame on the respective channel. Upon detecting a frame, the channel sensing circuitry output a notification of the detection. The communication circuitry 50 may then check a status of a frame decoder 52. If the frame decoder 52 is currently busy decoding a frame from another channel, the communication circuitry may trigger buffering of the detected frame into a buffer 66 in the above-described manner. Meanwhile, a flag may be used to indicate that the buffer 66 contains detected frame(s) to be decoded. When the frame decoder finishes the decoding, the frame decoder may check the status of the flag and, if the flag is lit, the frame decoder may retrieve frame samples from the buffer for decoding. If the frame decoder 52 is idle, the frame may be directed to decoding in the frame decoder 52.

In various embodiments, the frame decoder performs various types of decoding. For example, the radio modem may perform only synchronization to the received frame and perform sampling of the received frame. Thereafter, the decoder may perform the subsequent receiver signal processing functions such as demodulation, channel decoding, header extraction, decoding of header fields, etc. As another example, the radio modem 58 may perform demodulation and channel decoding and other physical layer processing, and the frame decoder realizes the MAC layer decoding, e.g. extraction and decoding of MPDU field contents. Other implementations are equally possible.

In embodiments where the apparatus is the STA 100 or a similar client device or terminal device, the apparatus may further comprise an application processor 56 executing one or more computer program applications that generate a need to transmit and/or receive data through the communication circuitry 50. The application processor may form an application layer of the apparatus. The application processor may execute computer programs forming the primary function of the apparatus. For example, if the apparatus is a sensor device, the application processor may execute one or more signal processing applications processing measurement data acquired from one or more sensor heads. If the apparatus is a computer system of a vehicle, the application processor may execute a media application and/or an autonomous driving and navigation application. The application processor may generate data to be transmitted in the wireless network.

The apparatus may further comprise a memory 60 storing one or more computer program products 62 configuring the operation of said processor(s) of the apparatus. The memory 60 may further store a configuration database 64 storing operational configurations of the apparatus. The configuration database 64 may store, for example, the responsibilities of the radio modem and the frame decoder. The memory 60 may further store the buffer.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 7 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
at least one processor; and
at least one memory storing instructions that, when executed with the at least one processor, cause the apparatus at least to:
decode at least a first part of a first frame received on a first channel;
detect, during said decoding the first part of the first frame, transmission of a second frame on a second channel;
in response to said detecting, buffer at least a first part of the second frame, the first part of the second frame comprising duration information;
after said decoding the first part of the first frame, decode at least the first part of the second frame;
update, on the basis of the duration information, channel occupation information of the second channel;
start, based at least partly on the channel occupation information of the second channel indicating that the second channel not occupied, contention for channel access on the second channel.

2. The apparatus of claim 1, wherein the instructions when executed with the processor further cause the apparatus to channel sense concurrently on the first channel and the second channel.

3. The apparatus of claim 1, wherein the instructions when executed with the processor further cause the apparatus to perform said buffering when there are at least temporarily insufficient processing capacity to perform said decoding concurrently for the first frame and the second frame.

4. The apparatus of claim 1, wherein the channel occupation information comprises network allocation vector information.

5. The apparatus of claim 1, wherein the apparatus is for a terminal device associated to an access node of a wireless local area network.

6. The apparatus of claim 1, where the instructions when executed with the processor further cause the apparatus to suspend channel access on the second channel after an end of the second frame and during said decoding the at least first part of the second frame.

7. The apparatus of claim 1, where the instructions when executed with the processor further cause the apparatus to store, in connection with buffering the at least first part of the second frame, a start time of the second frame, and to update the channel occupation information of the second channel on the basis of the duration information and the start time of the second frame.

8. The apparatus of claim 1, where the instructions when executed with the processor further cause the apparatus to buffer the at least first part of the second frame after synchronizing to the second frame.

9. The apparatus of claim 1, where the instructions when executed with the processor further cause the apparatus to, upon detecting a frame transmission on the first channel substantially simultaneously with detecting a frame transmission on the second channel, select one of the two frame transmissions for said decoding on the basis of a determined criterion.

10. The apparatus of claim 1, wherein the first part of the first frame comprises a first physical layer convergence protocol preamble, a first physical layer convergence protocol header, and a first medium access control protocol data unit, and the first part of the second frame comprise a second physical layer convergence protocol preamble, a second physical layer convergence protocol header, and a second medium access control protocol data unit.

11. A method for an apparatus of a wireless network, comprising:
decoding, with the apparatus, at least a first part of a first frame received on a first channel;
detecting, with the apparatus during said decoding the first part of the first frame, transmission of a second frame on a second channel;
in response to said detecting, buffering with the apparatus at least a first part of the second frame, the first part of the second frame comprising duration information;
after said decoding the first part of the first frame, decoding with the apparatus at least the first part of the second frame;
updating, with the apparatus on the basis of the duration information, channel occupation information of the second channel;
starting, with the apparatus based at least partly on the channel occupation information of the second channel indicating that the second channel not occupied, contention for channel access on the second channel.

12. The method of claim 11, wherein the apparatus performs channel sensing concurrently on the first channel and the second channel.

13. The method of claim 11, wherein the apparatus performs said buffering when the apparatus has at least temporarily insufficient processing capacity to perform said decoding concurrently for the first frame and the second frame.

14. The method of claim 11, wherein the channel occupation information comprises network allocation vector information.

15. The method of claim 11, wherein the apparatus performing the method is a terminal device associated to an access node of a wireless local area network.

16. The method of claim 11, wherein the apparatus suspends channel access on the second channel after an end of the second frame and during said decoding the at least first part of the second frame.

17. The method of claim 11, wherein the apparatus stores, in connection with buffering the at least first part of the second frame, a start time of the second frame, and updates the channel occupation information of the second channel on the basis of the duration information and the start time of the second frame.

18. The method of claim 11, wherein the apparatus buffers the at least first part of the second frame after synchronizing to the second frame.

19. The method of claim 11, wherein the apparatus selects, upon detecting a frame transmission on the first channel substantially simultaneously with detecting a frame transmission on the second channel, one of the two frame transmissions for said decoding on the basis of a determined criterion.

20. A non-transitory computer readable medium comprising program instructions that, when executed with an apparatus of a wireless network, cause the apparatus to perform at least the following:
- decoding at least a first part of a first frame received on a first channel;
- detecting, during said decoding the first part of the first frame, transmission of a second frame on a second channel;
- in response to said detecting, buffering at least a first part of the second frame, the first part of the second frame comprising duration information;
- after said decoding the first part of the first frame, decoding at least the first part of the second frame;
- updating, on the basis of the duration information, channel occupation information of the second channel;
- starting, based at least partly on the channel occupation information of the second channel indicating that the second channel not occupied, contention for channel access on the second channel.

* * * * *